US012075915B2

(12) United States Patent
Rouhi

(10) Patent No.: US 12,075,915 B2
(45) Date of Patent: Sep. 3, 2024

(54) SLEEPING AND RESTING APPARATUS

(71) Applicant: Javid Rouhi, Springfield, VA (US)

(72) Inventor: Javid Rouhi, Springfield, VA (US)

(*) Notice: Subject to any disclaimer, the term of this patent is extended or adjusted under 35 U.S.C. 154(b) by 259 days.

(21) Appl. No.: 17/860,042

(22) Filed: Jul. 7, 2022

(65) Prior Publication Data

US 2024/0008654 A1 Jan. 11, 2024

(51) Int. Cl.

| | |
|---|---|
| *A47C 21/04* | (2006.01) |
| *A47C 27/00* | (2006.01) |
| *A47C 27/08* | (2006.01) |
| *A47C 27/10* | (2006.01) |
| *A47C 31/00* | (2006.01) |
| *A47C 31/12* | (2006.01) |
| *A61G 7/057* | (2006.01) |

(52) U.S. Cl.

CPC ............ *A47C 21/048* (2013.01); *A47C 21/04* (2013.01); *A47C 27/00* (2013.01); *A47C 27/086* (2013.01); *A47C 27/10* (2013.01); *A47C 31/001* (2013.01); *A47C 31/123* (2013.01); *A61G 7/05738* (2013.01); *A61G 2210/90* (2013.01)

(58) Field of Classification Search

CPC ..... A47C 27/086; A47C 21/048; A47C 27/10; A47C 27/00; A47C 31/123; A47C 21/04; A47C 21/044; A47C 7/74; A47C 31/001; A61G 7/05738; A61G 2210/90; A61G 7/05784; A61G 7/05769; A61G 2210/70; A61G 2203/46

USPC .................................. 5/689, 702, 655.4, 909

See application file for complete search history.

(56) References Cited

U.S. PATENT DOCUMENTS

2011/0004998 A1* 1/2011 Losio .................. A47C 23/002 5/699
2011/0041254 A1* 2/2011 Howell .............. A61G 7/05746 5/689
2019/0151141 A1* 5/2019 Taylor .................... A61B 18/02

OTHER PUBLICATIONS

"Open Your Eyes Bedding." Hemp Sand Mattress, www.openyoureyesbedding.com/pages/gallery. Date: 2021 (Year: 2021).*
"Open Your Eyes Bedding." Hemp Sand Mattress or Buckwheat Hull Mattress, www.openyoureyesbedding.com/blogs/news/hemp-sand-mattress-or-a-buckwheat-hull-mattress-which-is-best. Date: 2020 (Year: 2020).*

* cited by examiner

*Primary Examiner* — Justin C Mikowski
*Assistant Examiner* — Madison Emanski
(74) *Attorney, Agent, or Firm* — IP Consulting Group; Michael Razavi; Alfred F Hoyte, Jr.

(57) ABSTRACT

A sleeping and resting apparatus is disclosed that may include a bottom enclosure including a plurality of associated walls defining a first spatial region and an array of compartments positioned within the first spatial region defined by the plurality of walls associated with the bottom enclosure. Each compartment may store a predefined volume of granular material. A top enclosure may include a plurality of associated walls defining a second spatial region and an array of flexible containers positioned within the second spatial region. Each flexible container may store a predefined volume of granular material. At least one temperature controlling element may be positioned in physical proximity with the bottom enclosure to add or remove heat from the granular material stored in at least one compartment of the array of compartments.

15 Claims, 6 Drawing Sheets

SLEEPING AND RESTING APPARATUS

TECHNICAL FIELD

This disclosure relates generally to a mattress, and more specifically to an improved mattress filled with particulate and granular material which can be thermally controlled.

BACKGROUND

Inner spring mattress had their humble beginnings as a simple coil spring technology was first patented in the year 1865. Eventually, the innerspring mattress would be widely combined with a box spring to provide further support in the form of a firm platform usually constructed from an upholstered structure of wood and wire. Later, pocketed springs, or springs separately encased in a fabric or textile material were introduced in the year 1900 by inventors like James Marshall. In the decades that followed, various other forms of mattresses were invented including mechanically adjustable mattresses, foam rubber-filled mattresses (i.e. visco-elastic, polyurethane, or latex foam, etc.), water-filled mattresses, and air-filled mattresses.

The modern mattress designs have enjoyed tremendous commercial success, yet they still present an unnatural sleeping surface for humans who have evolved sleeping on bedding made of natural materials having none of the resiliency of a box spring. As such, the modern inner spring mattress have been identified as the cause of chronic back pain, shoulder pain, neck pain, poor sleep, and insomnia. To address these problems associated with the modern mattresses, some users seek alternatives such as sleeping on solid or very firm surfaces.

In addition to a comfortable surface to sleep on, the users also may desire to control the temperature of the sleeping surface. While heated mattresses are known, they suffer from a number of drawbacks, chiefly being the inability of the mattress to hold the heat after the heating element has cooled leading to the need for near continuous heating cycles at almost any temperature.

Further, new researches have demonstrated an energetic exchange exists between the body and the earth that can be beneficial and healing to the body's functions.

Therefore, an improved sleeping and resting apparatus, and in particularly an improved mattress is desired that can overcome the challenges associated with modern mattresses and meet the beneficial and healing requirements for the body's functions.

SUMMARY

In one embodiment, a sleeping and resting apparatus is disclosed. The sleeping and resting apparatus may include a bottom enclosure that may further include a plurality of associated walls defining a first spatial region and an array of compartments positioned within the first spatial region defined by the plurality of walls associated with the bottom enclosure. Each compartment of the array of compartments may be configured to store a maximum predefined volume of granular material. The sleeping and resting apparatus may further include a top enclosure which may further include a plurality of associated walls defining a second spatial region and an array of flexible containers positioned within the second spatial region defined by the plurality of walls associated with the top enclosure. Each flexible container of the array of flexible containers may be configured to store a maximum predefined volume of granular material. The sleeping and resting apparatus may further include at least one temperature controlling element positioned in physical proximity with the bottom enclosure to add or remove heat from the granular material stored in at least one compartment of the array of compartments.

In some embodiments, the at least one temperature controlling element may be a heating coil configured to generate heat, wherein the heating coil is electrically powered. Further, the granular material may be sand, or alternately, the granular material may be a mixture of sand and a particulate material. In some example embodiments, the bottom enclosure may include eight compartments. Further, in some exemplary embodiments, a material of each flexible container of the array of flexible containers may be selected from cotton and canvas, and the material of each flexible container of the array of flexible containers may include at least one property of a set of properties comprising: breathability, non-toxic, flame resistant, and thermal conductivity. The bottom enclosure may include a first height. The top enclosure may include a second height. Further, the second height may be lesser than the first height.

In some embodiments, the bottom enclosure may further include one or more dividing walls positioned within the first spatial region. The one or more dividing walls may define the array of compartments within the first spatial region. Each of the one or more dividing walls may include at least one temperature controlling element positioned along a surface associated with each of the one or more dividing walls.

In an embodiment, another sleeping and resting apparatus is disclosed. The sleeping and resting apparatus may include a frame which may further include a plurality of elongated members defining a horizontal plane and at least four corners and at least four legs. Each of the at least four legs may be attached to at least one elongated member of the plurality of elongated members. Each of the at least four legs may be aligned perpendicular to the horizontal plane. The sleeping and resting apparatus may further include a frame cover configured to be positioned over the frame. The frame cover may include a horizontal surface and a plurality of walls aligned perpendicular to the horizontal surface. The horizontal surface may be configured to the positioned along the horizontal plane. Each of the plurality of walls may be configured to be positioned along an associated elongated member of the plurality of elongated members. The frame cover may further include at least one temperature controlling element positioned along the horizontal surface associated with the frame cover. The sleeping and resting apparatus may further include a flexible sheet configured to be fastened to each of the plurality of walls encompassing a top surface of the horizontal surface, to thereby define a containment space. The containment space may be configured to store a maximum predefined volume of granular material.

In some embodiments, the above sleeping and resting apparatus may further include a plurality of side panels. The flexible sheet may be configured to be fastened to each of the plurality of walls via an associated side panel of the plurality of side panels. Further, the flexible sheet may be configured to be fastened to each of the plurality of walls via a plurality of fasteners. The plurality of fasteners may be selected from a screw, a nut-bolt assembly, and a rivet.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Figure 1:
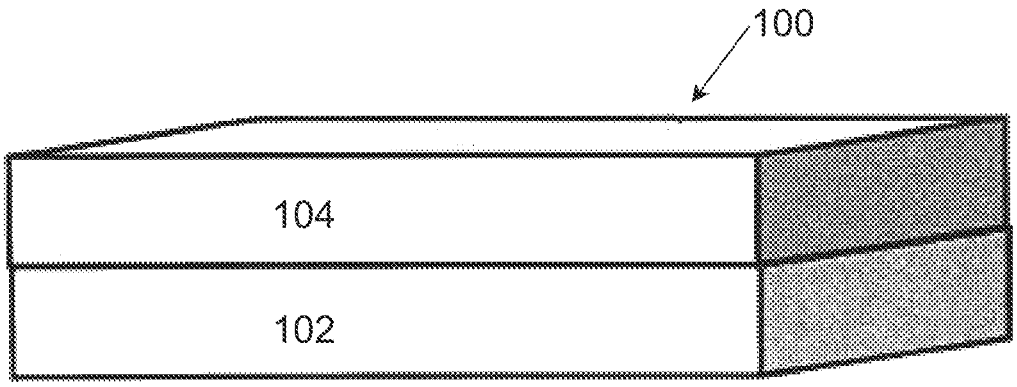
FIG. 1 illustrates a perspective view of a sleeping and resting apparatus, in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The present disclosure provides for an improved sleeping and resting apparatus, and in particularly a sand-filled mattress. It is an objective of the present subject matter to provide an improved mattress assembly. Further, it is an objective of the present subject matter to provide a mattress assembly that is filled with a particulate or a granulated matter. Further, it is an objective of the present subject matter to provide a mattress assembly that is filled with sand. Further, it is an objective of the present subject matter to provide a mattress assembly that is filled with sand mixed with other particulate matter. Further, it is an objective of the present subject matter to provide a mattress assembly that is filled with heated particulate or granulated matter. Further, it is an objective of the present subject matter to provide a mattress assembly that is filled with particulate or granulated matter where the particulate or granular matter has a particular thermal conductivity. Further, it is an objective of the present subject matter to provide a mattress assembly that is filled with particulate or granulated matter where the particulate or granular matter has an electrical insulating property.

Accordingly, the present disclosure provides for a sleeping and resting apparatus which is an assembly of preferably two enclosures, at least one of which is filled with a granular material. A bottom enclosure is preferably compartmentalized, and in a preferred embodiment, may include eight compartments, and may include as many as 16 or 20 compartments, depending upon the size and shape of the mattress. The compartments give the mattress extra rigidity and prevent large volumes of granular material from sifting from one side of the mattress to the other. A top or upper enclosure may be shallower and may contain sand contained in individual flexible containers such as a plurality of tiled or arrayed plastic bags. It can be readily appreciated that a large container filled with undivided granular material will produce and unwieldy “bean bag” effect and an always uneven sleeping surface. The containers may be made of a heavy durable sheet material such as cotton or canvas, that is breathable, non-toxic, and treated to be flame resistant. While durable, the material should be sufficiently thin to allow for efficient thermal conduction. When vertically stacked, the bottom and top enclosures have the same “feel” as a single enclosure filled with a granular material, with the problem of sifting material eliminated using the dual compartmented enclosures. The granular material may be ordinary sand or silica, but any finely ground, non-toxic material may be used. Preferably, a material having high thermal conductivity and low electrical conductivity such as Aluminum Nitride mixed in with the sand may be used to improve both properties of the sand.

The above assembly may be heated. To this end, the bottom enclosure may be provided with dividing walls with heating elements. Alternatively, the walls themselves may be the heating elements, so as to increase the heat radiating surface area to more rapidly heat the granular material. The heating elements may be, for example, made of ceramic, but any suitable material for heating the granular material as would be apparent to one of skill in the art may be used. It can be appreciated that with a dense material such as sand, once heated, the heat will dissipate slowly so that the heating element may need only two to three cycles times during a sleeping period, which is both safer and power efficient. Electrical power may be supplied via a power cord which can be connected to an AC outlet. A switch allowing for a range of heated temperatures may be provided. Suitable safety means such as a step-down transformer, timer, and overheat or timed shut down circuits may be provided and utilized in well-known manner. The heat can reach a maximum of about 120 degrees and may be used at this temperature for brief periods to kill or reduce bed bugs. During usage, a user may sleep on the top enclosure 22, and the bottom enclosure may be used to provide a desired amount of warmth.

Referring to FIG. 1, a perspective view of a sleeping and resting apparatus 100 is illustrated, in accordance with some embodiments of the present disclosure. The sleeping and resting apparatus 100 may include a bottom enclosure 102 and a top enclosure 104. The top enclosure 104 may be configured to the be positioned vertically above the bottom enclosure 102. Further, in some embodiments, the top enclosure 104 may be in thermal contact with the bottom enclosure 102 while being positioned vertically above the bottom enclosure 102. For example, the top enclosure 104 may be in physical contact with the bottom enclosure 102 to allow thermal conduction between the bottom enclosure 102 and the top enclosure 104. The bottom enclosure 102 and the top enclosure are further explained in detail in conjunction with FIGS. 2-3.

Figure 2:
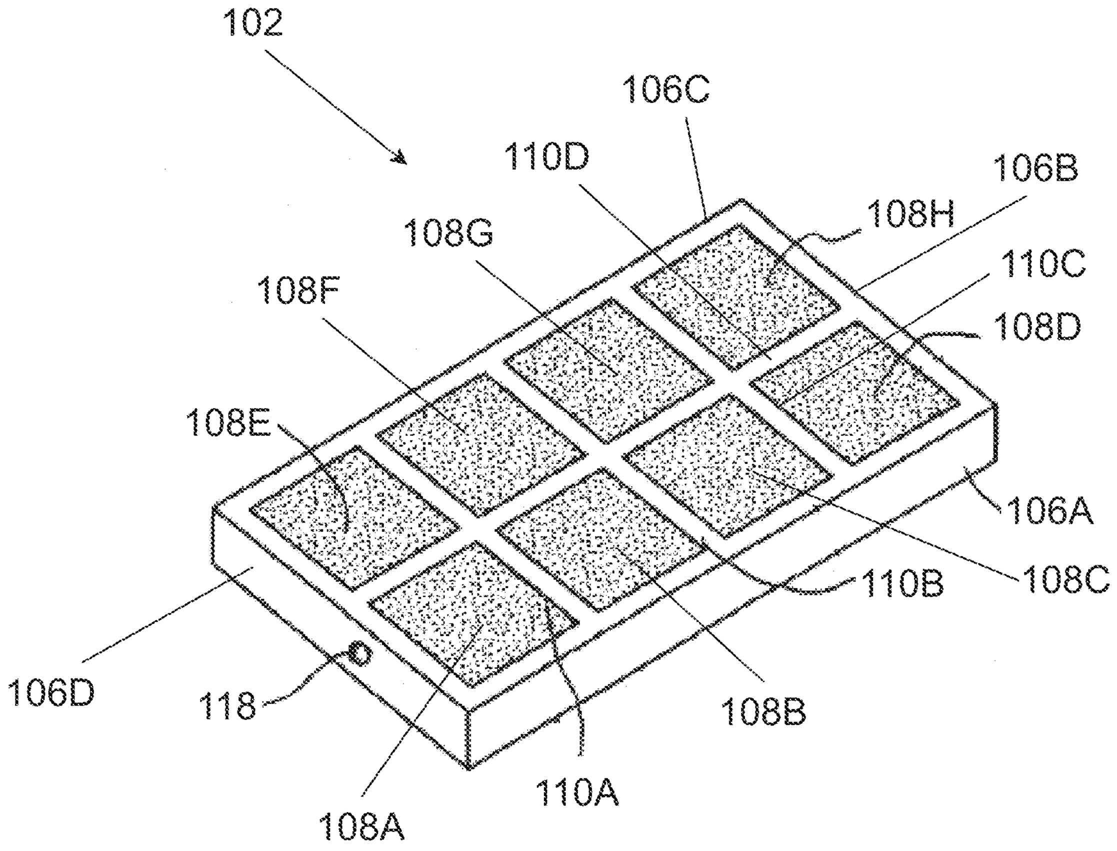
FIG. 2 illustrates a perspective view of a bottom enclosure of the sleeping and resting apparatus of FIG. 1, in accordance with some embodiments of the present disclosure.
Figure 3:
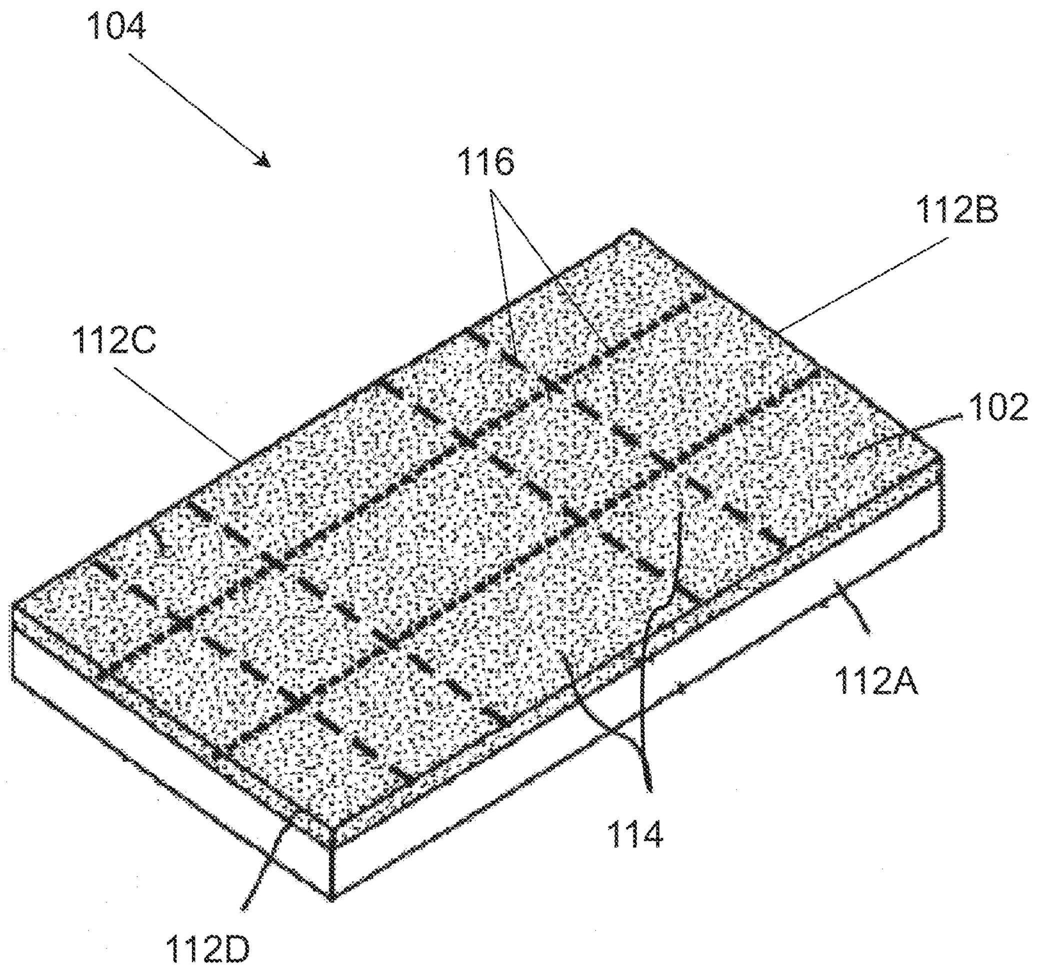
FIG. 3 illustrates a perspective view of a top enclosure of the sleeping and resting apparatus of FIG. 1, in accordance with some embodiments of the present disclosure.

Referring now to FIG. 2, a perspective view of the bottom enclosure 102 is illustrated, in accordance with some embodiments of the present disclosure. The bottom enclosure 102 may include a plurality of associated walls 106 defining a first spatial region therewithin. As shown in FIG. 3, the bottom enclosure 102 may include four walls 106A, 106B, 106C, 106D (hereinafter, together referred to as walls 106) defining the first spatial region therewithin. The four walls 106A, 106B, 106C, 106D may be arranged in a square or a rectangular configuration. For example, for a square configuration, the length of each side may be 64 inches (5 feet 4 inches). Further, the four walls 106A, 106B, 106C, 106D may have same height. For example, the height of the four walls 106A, 106B, 106C, 106D may be 18.125 inches (1 feet and 6.25 inches).

In some embodiments, the bottom enclosure 102 may further include an array of compartments 108 positioned within the first spatial region defined by the plurality of walls 106 associated with the bottom enclosure 102. For example, as shown in FIG. 3, the bottom enclosure 102 may include an array of eight compartments 108A, 108B, 108C, 108D, 108E, 108F, 108G, 108H (hereinafter, together referred to as compartments 108). However, in alternate embodiments, the bottom enclosure 102 may include an array of sixteen or twenty compartments as well. By way of an example, the array of compartments 108 may be defined by one or more dividing walls. As such, in some embodiments, the bottom enclosure 102 may further include one or more dividing walls 110 positioned within the first spatial region. The one or more dividing walls 110 define the array of compartments 108 within the first spatial region. As shown in FIG. 3, the bottom enclosure 102 may include four dividing walls 110A, 110B, 110C, 110D (hereinafter, together referred to as dividing walls 110). The dividing walls 110 may divide the first spatial space into compartments 108 of same shapes and sizes. For example, the dividing walls 110, as shown in FIG. 3, may divide the first spatial space into compartments 108 having same square or rectangular configuration of same shapes and sizes. However, it may be noted that any other shape of the compartments 108 may be possible as well, without deviating from the scope of the present disclosure.

The bottom enclosure 102 may further include a base (not shown in FIG. 3). The base may be attached to an edge of each of the walls 106 and the dividing walls 110 to define open top face storage boxes. As such, each compartment of the first array of compartments 108 may be configured to store a maximum predefined volume of granular material. It should be noted that the granular material may be ordinary sand or silica, or any other finely ground, non-toxic material may be used. Preferably, the granular material may be a material having high thermal conductivity and low electrical conductivity, and as such may include Aluminium Nitride mixed in sand to improve both the properties of the sand.

The walls 106 and the dividing walls 110 may be made of rigid material, that provides the bottom enclosure 102 extra rigidity. For example, the walls 106 and the dividing walls 110 may be made from a material selected from a metal, an alloy, or a composite material having heat conduction property. Further, the base also may be made of the same material as the walls 106 and the dividing walls 110, the material being selected from a metal, an alloy, or a composite material having heat conduction property. The compartments 108 prevent large volumes of granular material from sifting from one side of the bottom enclosure to the other.

Referring now to FIG. 3, a perspective view of the top enclosure 104 is illustrated, in accordance with some embodiments of the present disclosure. The top enclosure 104 may include a plurality of associated walls 112 defining a second spatial region. As shown in FIG. 3, the top enclosure 104 may include four walls 112A, 112B, 112C, 112D (hereinafter, together referred to as walls 112) defining the second spatial region therewithin. The four walls 112A, 112B, 112C, 112D may be arranged in a square or a rectangular configuration, corresponding to the walls 106 of the bottom enclosure. The four walls 112A, 112B, 112C, 112D may have same height. For example, the height of four walls 112A, 112B, 112C, 112D may be 10 inches.

In some embodiments, the bottom enclosure includes a first height, and the top enclosure includes a second height, such that the second height is lesser than the first height. In other words, the top enclosure may be shallower as compared to the bottom enclosure. As already mentioned above, the height of the bottom enclosure may be 18.125 inches while the height of the top enclosure may be 10 inches.

In some embodiments, top enclosure 104 may further include an array of flexible containers 114 positioned within the second spatial region defined by the plurality of walls 112 associated with the top enclosure 104. For example, as shown in FIG. 3, the top enclosure 104 may include an array of fifteen flexible containers 114.

By way of an example, the array of flexible containers 114 may be defined by one or more dividing walls 116. As such, in some embodiments, the top enclosure 104 may further include the one or more dividing walls 116 positioned within the second spatial region, such that the one or more dividing walls 116 define the array of flexible containers 114 within the second spatial region. As shown in FIG. 3, the top enclosure 104 may include six dividing walls. The dividing walls 116 may divide the second spatial space into flexible containers 114 of same or different shapes and sizes. For example, the dividing walls 116, as shown in FIG. 3, may divide the first spatial space into flexible containers 114 having square or rectangular configurations. However, it may be noted that any other shape of the flexible containers 114 may be possible as well, without deviating from the scope of the present disclosure.

By way of another example, the second spatial space defined by the walls 112 of the top enclosure 104 may house the array of flexible containers 114. In other words, the flexible containers 114 may be independent units that may be positioned within the second spatial space. For example, the flexible containers 114 may be bags made of a fabric, a polymer, or a composite material.

Each flexible container of the array of flexible containers 114 may be configured to store a maximum predefined volume of granular material. The granular material may be the same as the granular material which is stored in the compartments 108. As such, the granular material may be ordinary sand or silica, or any finely ground, non-toxic material, and preferably, a material having high thermal conductivity and low electrical conductivity, including Aluminium Nitride mixed in sand. For example, the material of the flexible containers 114 may be durable and at the same time sufficiently thin to allow for efficient thermal conduction.

Each of the flexible containers 114 may include an opening to receive the granular material and a closing mechanism to close the opening temporarily or permanently. For example, the closing mechanism may include snap fasteners, drawstring, etc. Once filled with the granular material, the height of the flexible containers 114 may be 8 inches. The flexible containers 114 may be arrayed or tiled within the top enclosure 104. As will be appreciated, a large container filled with undivided granular material will produce an unwieldy “bean bag” effect and an always uneven sleeping surface.

The flexible containers 114 may be made from a heavy-duty material, such as cotton and canvas. Further, the material of each of the flexible containers 114 may possess at least one property including breathability, non-toxic, flame resistant, and high thermal conductivity.

When vertically stacked, the bottom enclosure 102 and the top enclosure 104 may provide the same feel as a single enclosure filled with a granular material. However, the problem of sifting material is eliminated by way of using the dual compartmented enclosures.

In some embodiments, the sleeping and resting apparatus 100 may further include at least one temperature controlling element, which may be positioned in physical proximity with the bottom enclosure 102 to add or remove heat from the granular material stored in at least one compartment of the array of compartments 108. By way of an example, the temperature controlling element may be positioned along the walls 106 or the dividing walls 110 of the bottom enclosure 102. Alternately, the temperature controlling element may be positioned between the bottom enclosure 102 and the top enclosure 104. In other words, the temperature controlling element may be positioned on a top surface of the bottom enclosure 102, i.e. on the top of the array of containers 108.

It should be noted that the temperature controlling element may add or remove heat from the granular material stored in at least one compartment of the array of compartments 108, to thereby increase or decrease the temperature of the granular material stored in the compartments 108. Further, in some embodiments, the walls 106 and the dividing walls 110 themselves may be heating elements, so as to increase the heat radiating surface area to more rapidly heat the granular material. It should however be noted that the granular material may posses electrical insulating property, to prevent leakage of electrical current from the heating elements to the user (seated or rested over the top enclosure 104)

In some example embodiments, the at least one temperature controlling element may be a heating coil configured to generate heat. Further, the heating coil may be electrically powered. To this end, the heating coil may be accompanied by a power cord for supplying electrical power to the heating coil. For example, electrical power can be supplied via the power cord which can be connected to an AC outlet. Further, a switch 118 (or a thermostat) may be used for allowing for a range of temperatures. Furthermore, suitable safety means such as a step-down transformer, a timer, and an overheat or timed shut down circuit may be provided and utilized, as is well-known in the art. The temperature can reach a maximum of about 120 degrees. As will be appreciated, this temperature may be maintained for brief periods to kill or reduce bed bugs. Therefore, in use, a user may sleep on the top enclosure 104, and the bottom enclosure 102 may provide the desired amount of warmth.

In some embodiments, the heating elements may be made of a ceramic material, a metal, or an alloy. However, any other suitable material for heating the granular material, as would be apparent to one of skill in the art, may be used as well. Further, the heating elements may be operational at a Voltage of 110 Volts or 220 Volts. As it will be further appreciated, with a dense granular material such as sand, once heated the heat will dissipate slowly so that the heating element need only two or three cycles of heating, during a sleeping period. This is both safer and power efficient.

Figure 4:
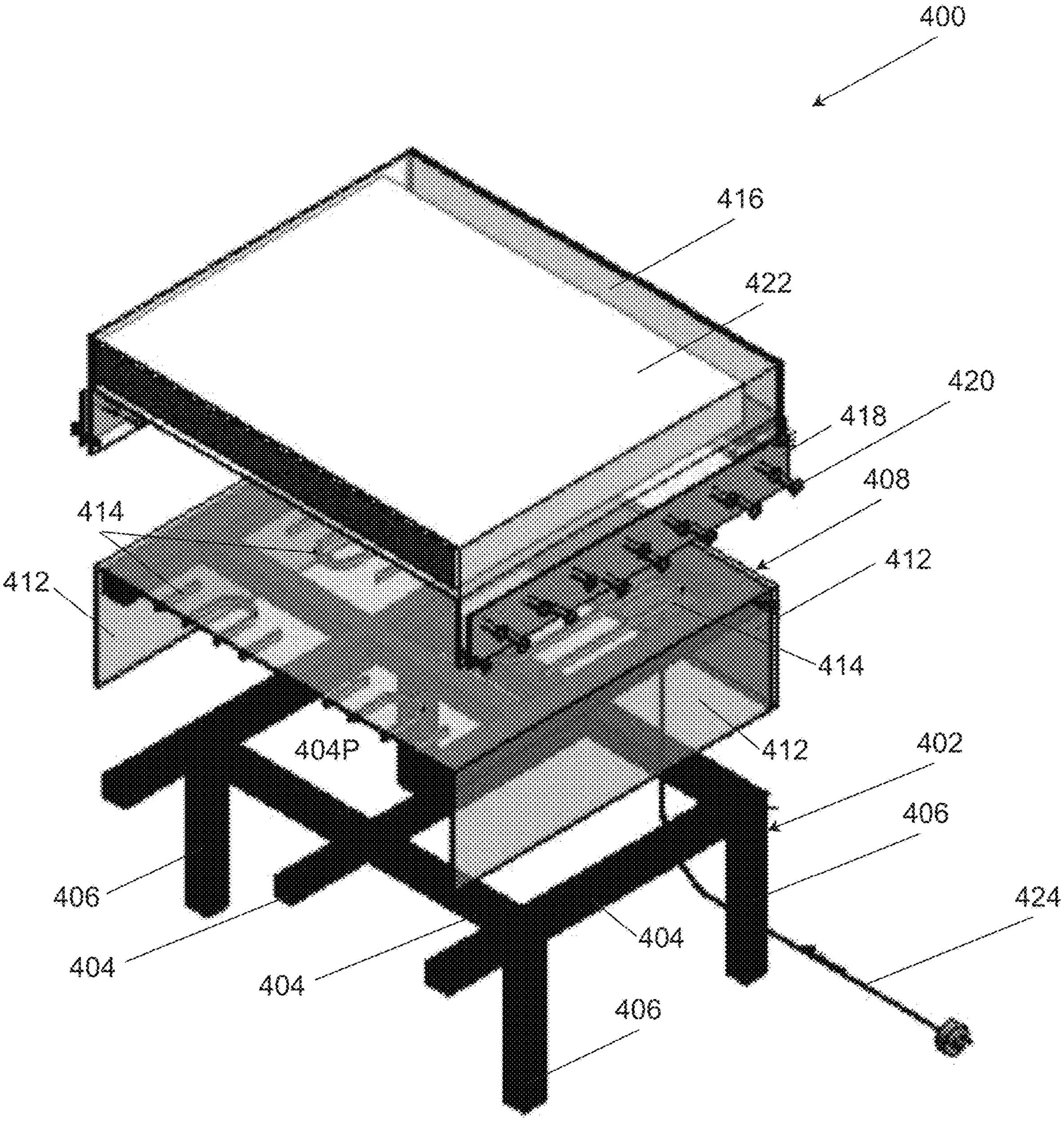
FIG. 4 illustrates an exploded isometric view of a sleeping and resting apparatus, in accordance with another embodiment of the present disclosure.
Figure 5:
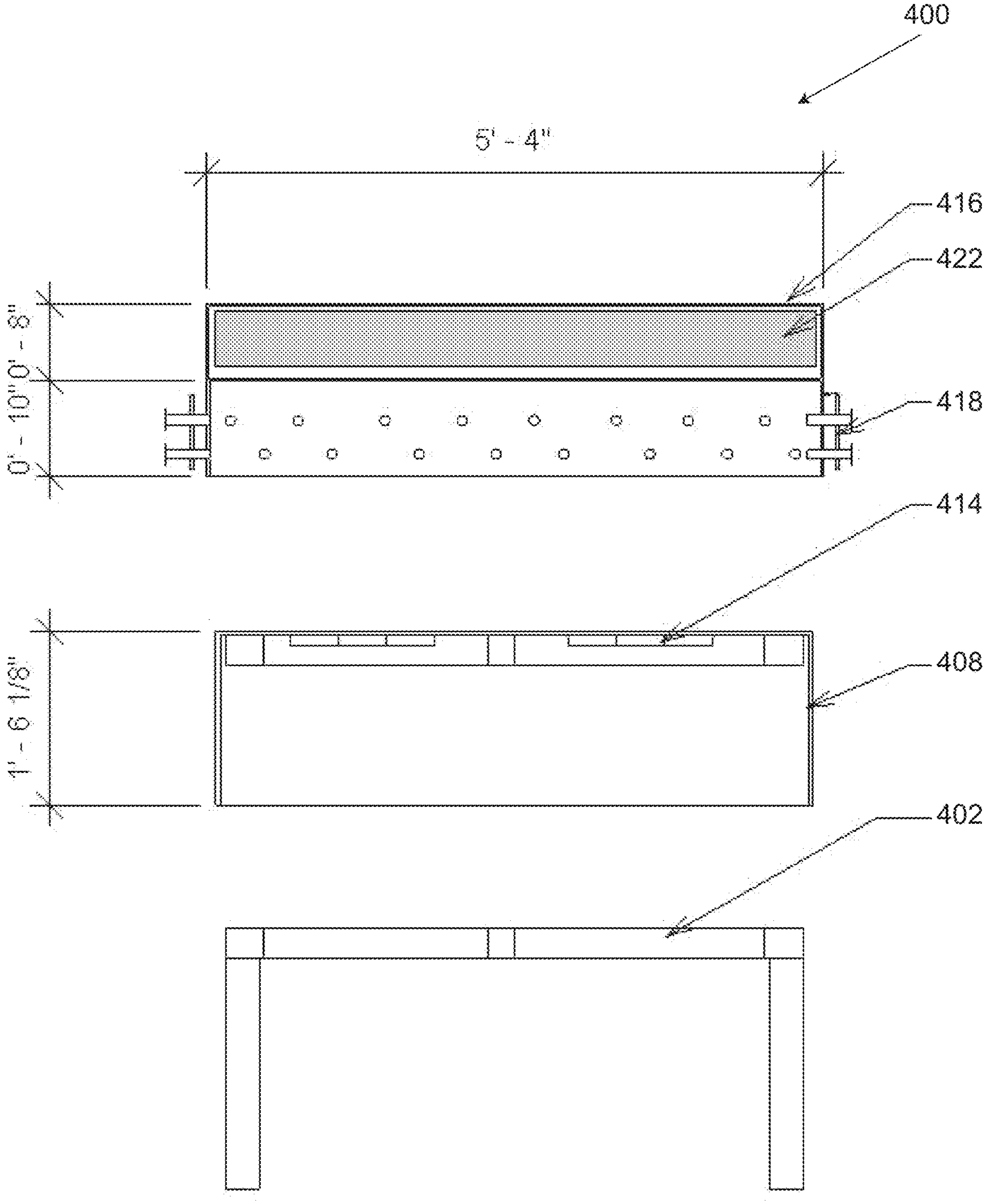
FIG. 5 illustrates an exploded side view of the sleeping and resting apparatus of FIG. 4, in accordance with some embodiment of the present disclosure.
Figure 6:
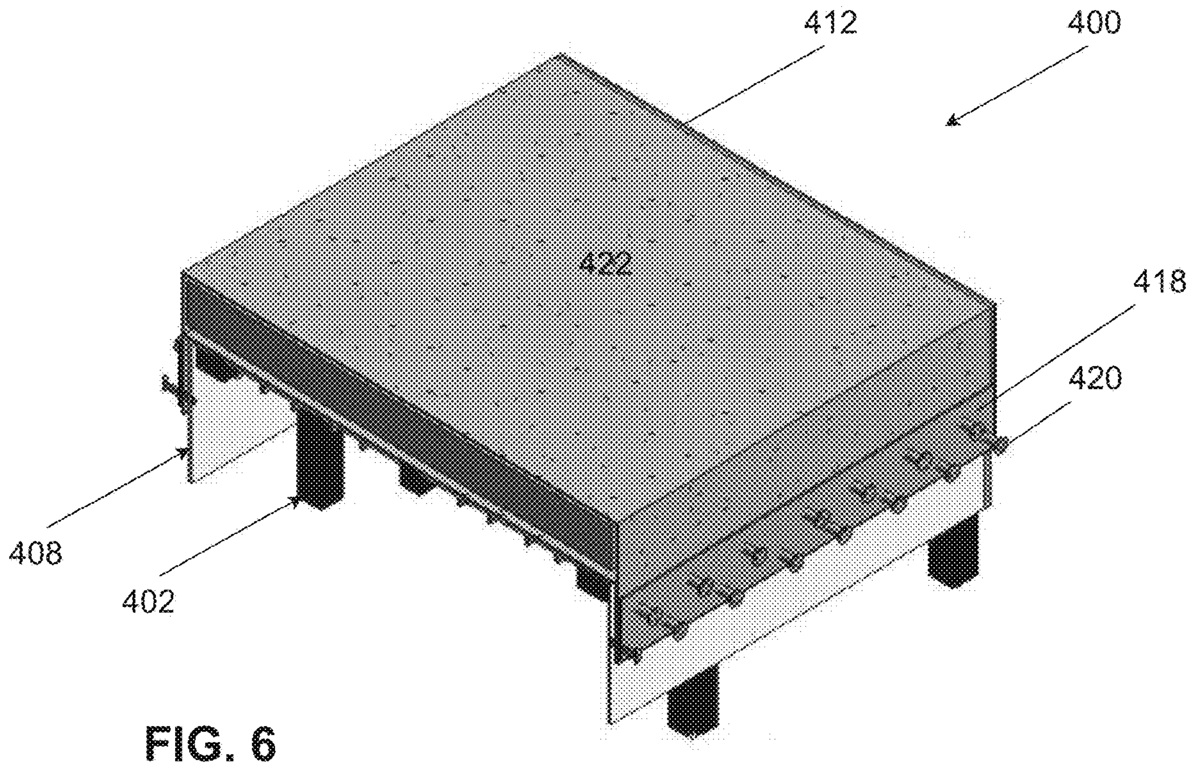
FIG. 6 illustrates a non-exploded (top) isometric view of the sleeping and resting apparatus of FIG. 4, in accordance with some embodiments of the present disclosure.
Figure 7:
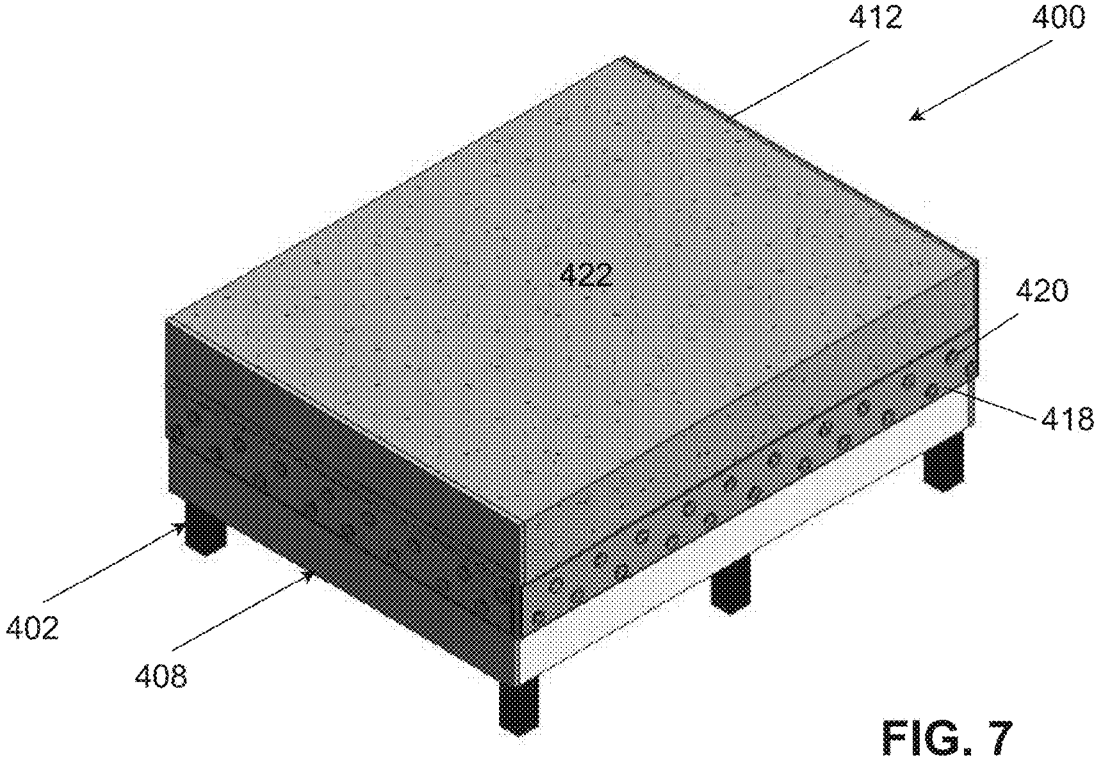
FIG. 7 illustrates an assembled (top) isometric view of the sleeping and resting apparatus of FIG. 4, in accordance with some embodiments of the present disclosure.
Figure 8:
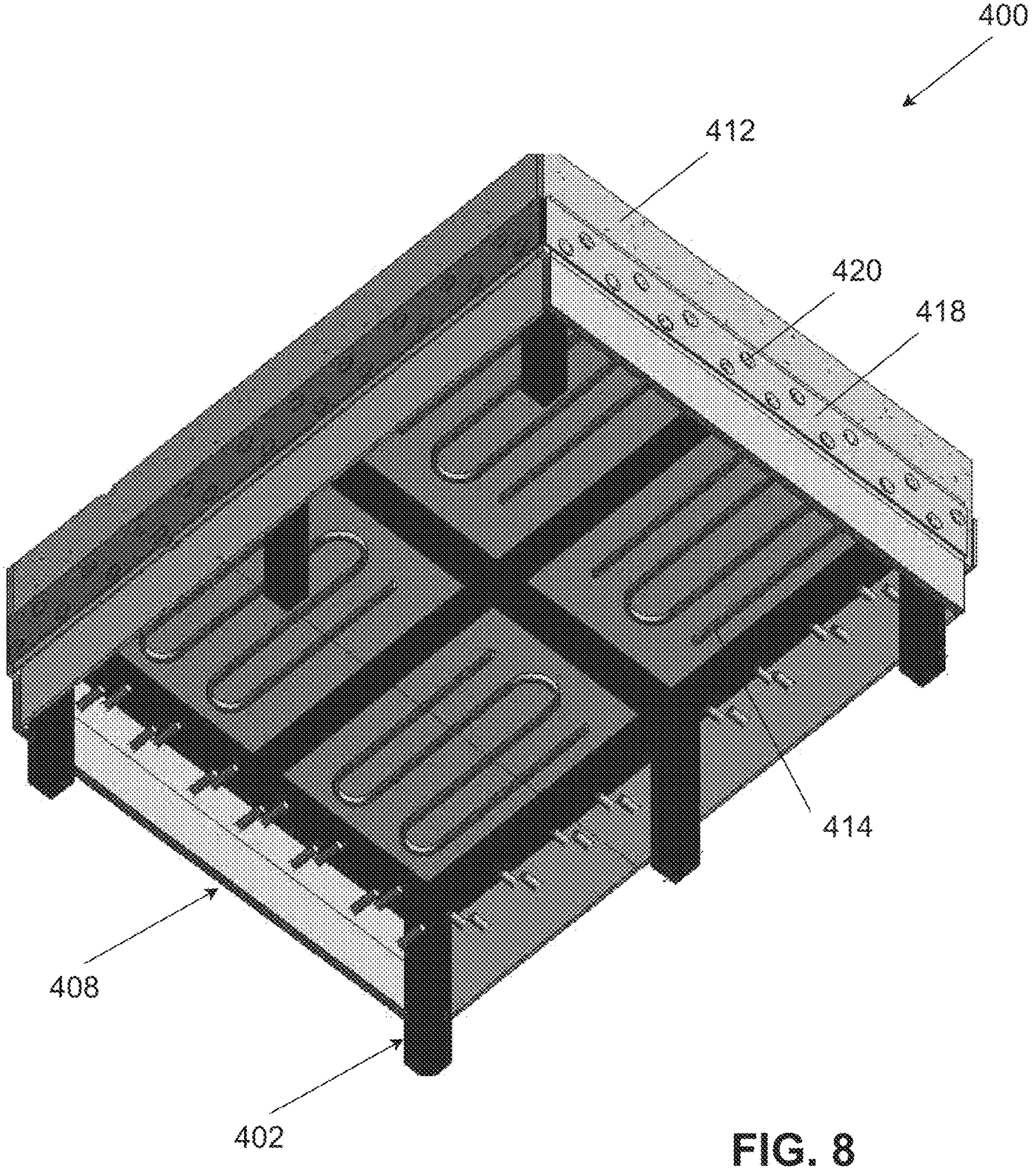
FIG. 8 illustrates an assembled (bottom) isometric view of the sleeping and resting apparatus of FIG. 4, in accordance with some embodiments of the present disclosure.

Referring now to FIGS. 4-8, various different views of a sleeping and resting apparatus 400 are illustrated, in accordance with some other embodiments of the present disclosure. In particular, FIG. 4 illustrates an exploded isometric view of a sleeping and resting apparatus, in accordance with another embodiment of the present disclosure. FIG. 5 illustrates a non-exploded side view of the sleeping and resting apparatus 400, in accordance with some embodiment of the present disclosure. FIG. 6 illustrates another non-exploded (top) isometric view of the sleeping and resting apparatus 400, in accordance with some embodiments of the present disclosure. FIG. 7 illustrates an assembled (top) isometric view of the sleeping and resting apparatus 400, in accordance with some embodiments of the present disclosure. FIG. 8 illustrates an assembled (bottom) isometric view of the sleeping and resting apparatus 400, in accordance with some embodiments of the present disclosure. The sleeping and resting apparatus 400 is a modification of the sleeping and resting apparatus 100, within the scope of the claimed subject matter.

The sleeping and resting apparatus 400 may include a frame 402. The frame 402, as shown in FIGS. 4-5, may include a plurality of elongated members 404 (the elongated members may have been individually referred to as elongated member 404 or collectively as elongated members 404 in this disclosure) defining a horizontal plane 404P and at least four corners. The frame 402 may further include at least four legs 406 (the at least four legs may have been individually referred to as leg 406 or collectively as legs 406, in this disclosure). Each leg 406 may be attached to at least one associated elongated member 404 of the plurality of elongated members 404. Further, each leg 406 may be aligned perpendicular to the horizontal plane 404P.

By way of an example, the elongated members 404 and the legs 406 may be made from any rigid material, preferably a metal or an alloy. Further, the elongated members 404 and the legs 406 may be attached to each other by welding or using fasteners like screws, nut-bolt assemblies, etc. As it can be appreciated, the elongated members 404 and the legs 406 may include a C-section or a L-section configuration. Alternately, the elongated members 404 and the legs 406 may include a tubular, i.e. a rectangular, a square, or a circular (cross section) configuration.

The sleeping and resting apparatus 400 may further include a frame cover 408 configured to be positioned over the frame 402. The frame cover 408 may include a horizontal surface 410. Further, the frame cover 408 may include a plurality of walls 412 (the plurality of walls may have been individually referred to as wall 412 or collectively as walls 412 in this disclosure) aligned perpendicular to the horizontal surface 410. For example, the horizontal surface 410 and the walls 412 may be made from a sheet metal, such as mild steel (MS), stainless steel (SS), etc. Further, the walls 412 may be attached to the horizontal surface 410 along their edges, for example, via welding or using fasteners like rivets, screws, or nut-bolt assemblies.

The frame cover 408 is configured to be positioned on the frame 402, such that the horizontal surface 410 is positioned along the horizontal plane 404P of the frame 402. Therefore, each of the plurality of walls 412 is configured to be positioned along an associated elongated member of the plurality of elongated members 404. For example, as shown in FIGS. 4-5, the frame 402 may have a rectangular configuration, with four elongated members 404 defining the four edges of the rectangular configuration. As such, the frame cover 408 may include four walls 412 corresponding to the four elongated members 404 defining the four edges of the rectangular configuration. The frame cover 408 may be sized so as to easily fit on the frame 402.

The sleeping and resting apparatus 400 may further include at least one temperature controlling element 414.

The at least one temperature controlling element 414 may be positioned along the horizontal surface 410 associated with the frame cover 408. In some example embodiments, the sleeping and resting apparatus 400 may further include four temperature controlling elements 414 positioned symmetrically along the horizontal surface 410. In alternate embodiments, the sleeping and resting apparatus 400 may further include any other number of temperature controlling elements 414 as well. Further, the temperature controlling elements 414 may be fitted to the horizontal surface 410 using inbuilt hooks or using fasteners. In some embodiments, the temperature controlling elements 414 may be provided on a bottom surface of the horizontal surface 410 (i.e. underneath the horizontal surface 410). The horizontal surface 410 may be made from a thermally conducting material like a metal or an alloy that allows the heat generated by the temperature controlling elements 414 to be conducted on a top surface of the horizontal surface 410. As will be described in detail in the subsequent sections of the present disclosure, the horizontal surface 410 may be used to store granular material over its top surface.

In some example embodiments, the at least one temperature controlling element 414 may be a heating coil configured to generate heat. Further, the temperature controlling element 414 may be electrically powered. To this end, the temperature controlling element 414 heating coil may be accompanied by a power cord 424 for supplying electrical power to the temperature controlling elements 414. For example, electrical power can be supplied via the power cord which can be connected to an AC outlet. Further, a switch (not shown in FIGS. 4-8) may be used for allowing for a range of temperatures. Furthermore, suitable safety means such as a step-down transformer, a timer, and an overheat or timed shut down circuit may be provided and utilized. The temperature can reach a maximum of about 120 degrees. As will be appreciated, this temperature may be maintained for brief periods to kill or reduce bed bugs.

The sleeping and resting apparatus 400 may further include a flexible sheet 416. The flexible sheet 416 may be configured to be fastened to the frame 402 or the frame cover 408. For example, the flexible sheet 416 may fastened to each of the plurality of walls 412 encompassing the top surface of the horizontal surface 410, to thereby define a containment space. The containment space may be configured to store a maximum predefined volume of the granular material 422.

In order to fasten the flexible sheet 416 to each of the plurality of walls 412, the sleeping and resting apparatus 400 may further include a plurality of side panels 418. The flexible sheet 416 may be fastened to each of the plurality of walls 412 via an associated side panel 418 of the plurality of side panels 418. For example, as shown in FIGS. 4-5, four side panels 418 may be used, such that one side panel of these four side panels 418 may be used to fasten the flexible sheet 416 to an associated wall 412 of the four walls 412. Further, the flexible sheet 416 may be fastened to each of the plurality of walls 412 via a plurality of fasteners 420. Each of the fasteners 420 may be selected from a screw, a nut-bolt assembly, and a rivet.

The flexible sheet 416 therefore may be fastened to the frame 402 or the frame member 408, to store and contain the granular material 422 within the containment space.

Various embodiments of a sleeping and resting apparatus, and in particular, a sand filled mattress are disclosed above. The above sand-filled mattress of the present disclosure provides a sleeping surface having a firm natural feel similar to sleeping on earth or any other natural surface. Further, the above sand-filled mattress uses sand, preferably mixed with other granular material having different hardness or thermal properties. A heating element in the form of a mattress sized enclosure is positioned beneath the sand filled mattress to provide a source of heat. Alternatively, heating elements may be imbedded within the sand filled mattress. These heating elements may be surrounded by a layer of insulating material, with both the sand and the other granular material serving as thermally conductive insulating material.

It is intended that the disclosure and examples be considered as exemplary only, with a true scope and spirit of disclosed embodiments being indicated by the following claims.

I claim:

1. A sleeping and resting apparatus comprising:
- a bottom enclosure comprising:
  - a plurality of associated walls defining a first spatial region; and
  - an array of compartments positioned within the first spatial region,
    - wherein each compartment of the array of compartments is configured to store a maximum predefined volume of granular material;
- a top enclosure comprising:
  - a plurality of associated walls defining a second spatial region; and
  - an array of flexible containers positioned within the second spatial region,
    - wherein each flexible container of the array of flexible containers is configured to store a maximum predefined volume of granular material; and
- at least one temperature controlling element to add or remove heat from the granular material stored in at least one compartment of the array of compartments.

2. The sleeping and resting apparatus as claimed in claim 1, wherein the at least one temperature controlling element is a heating coil configured to generate heat, wherein the heating coil is electrically powered.

3. The sleeping and resting apparatus as claimed in claim 1, wherein the granular material is sand.

4. The sleeping and resting apparatus as claimed in claim 1, wherein the granular material is a mixture of sand and a particulate material.

5. The sleeping and resting apparatus as claimed in claim 1, wherein the bottom enclosure comprises eight compartments.

6. The sleeping and resting apparatus as claimed in claim 1,
- wherein a material of each flexible container of the array of flexible containers is selected from cotton and canvas.

7. The sleeping and resting apparatus as claimed in claim 6,
- wherein the material of each flexible container of the array of flexible containers comprises at least one property of a set of property comprising:
  - breathability,
  - non-toxic,
  - flame resistant, and
  - thermal conductivity.

8. The sleeping and resting apparatus as claimed in claim 1,
- wherein the bottom enclosure comprises a first height,
- wherein the top enclosure comprises a second height.

9. The sleeping and resting apparatus as claimed in claim 8,
- wherein the second height is lesser than the first height.

10. The sleeping and resting apparatus as claimed in claim 8, wherein each of the one or more dividing walls comprises at least one temperature controlling element positioned along a surface associated with each of the one or more dividing walls.

11. The sleeping and resting apparatus as claimed in claim 1, wherein the at least one temperature controlling element is positioned in physical proximity with the bottom enclosure.

12. The sleeping and resting apparatus as claimed in claim 1, wherein the at least one temperature controlling element is positioned along a horizontal surface associated with a frame cover.

13. The sleeping and resting apparatus as claimed in claim 1, wherein a flexible sheet is configured to be fastened to each of the plurality of walls via a plurality of fasteners.

14. The sleeping and resting apparatus as claimed in claim 13, wherein the plurality of fasteners is selected from a screw, a nut-bolt assembly, and a rivet.

15. The sleeping and resting apparatus as claimed in claim 1, wherein the bottom enclosure further comprises one or more dividing walls positioned within the first spatial region, wherein the one or more dividing walls define the array of compartments within the first spatial region.

* * * * *